Jan. 15, 1952 — M. J. LEWIS — 2,582,638
METER TROUGH AND BOX
Filed Aug. 5, 1949 — 4 Sheets-Sheet 1
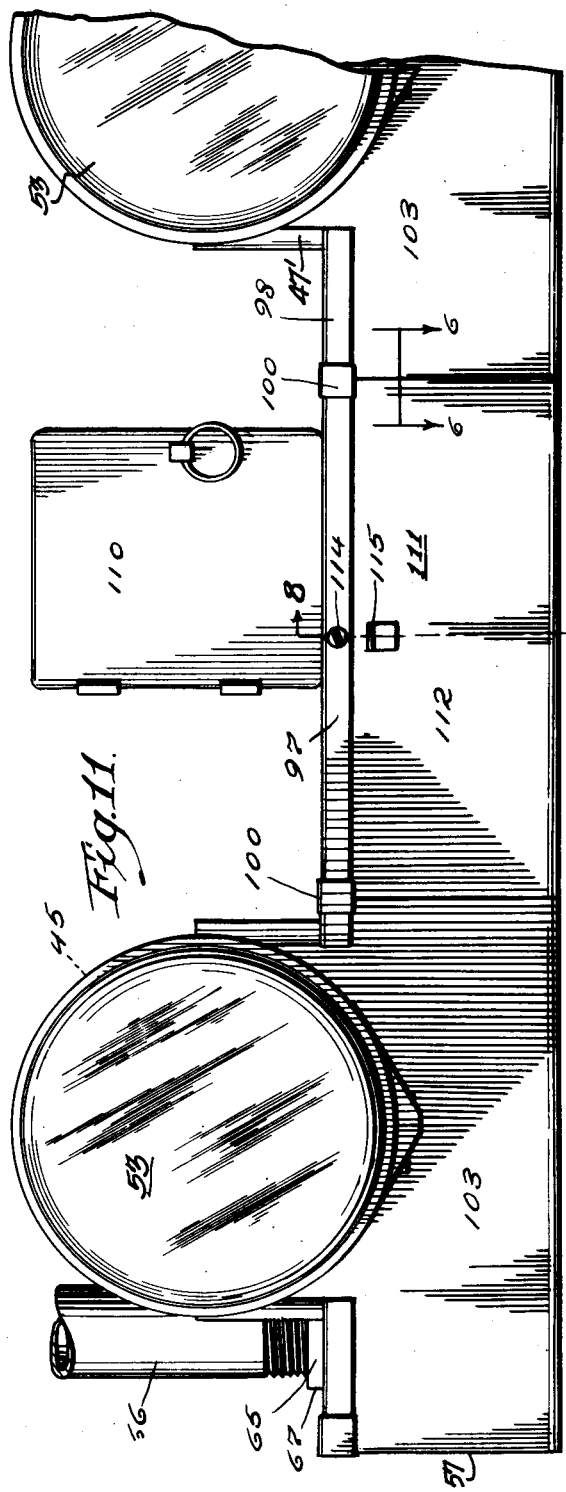
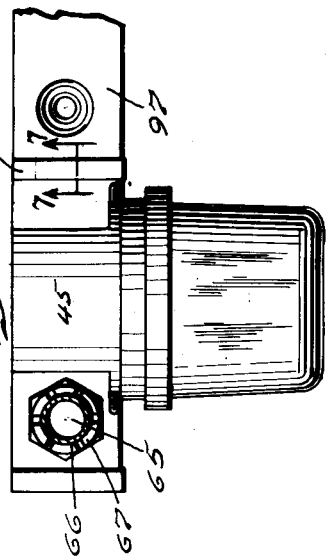
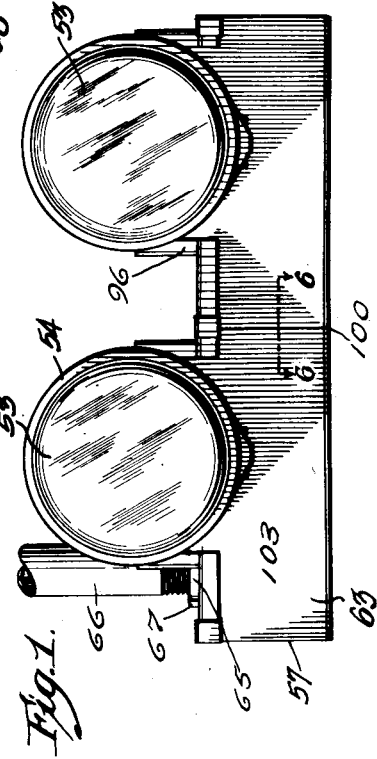
INVENTOR
Morgan J. Lewis
BY
ATTORNEYS Jan. 15, 1952  M. J. LEWIS  2,582,638
METER TROUGH AND BOX
Filed Aug. 5, 1949  4 Sheets-Sheet 2
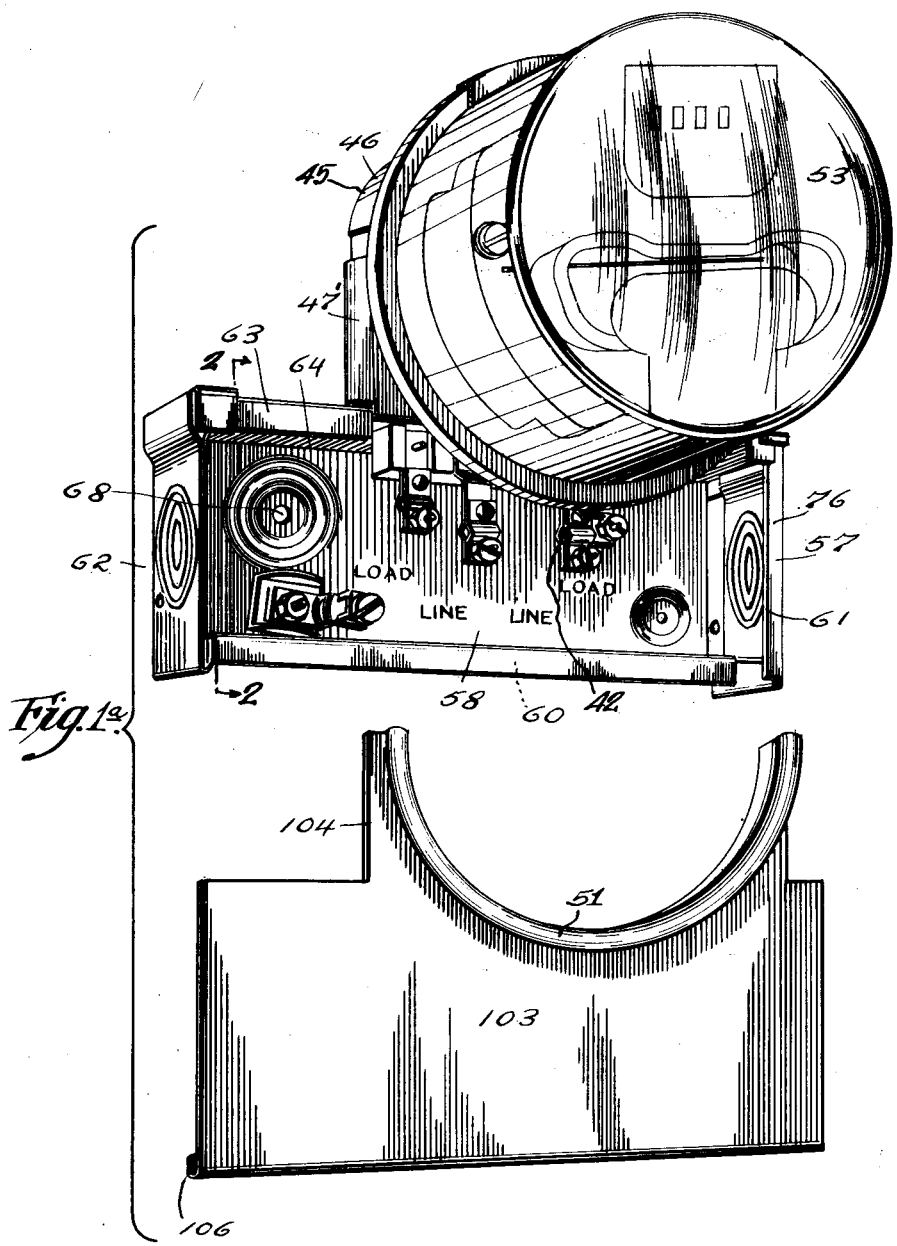
INVENTOR
Morgan J. Lewis
BY
ATTORNEYS Jan. 15, 1952     M. J. LEWIS     2,582,638
METER TROUGH AND BOX
Filed Aug. 5, 1949     4 Sheets-Sheet 3
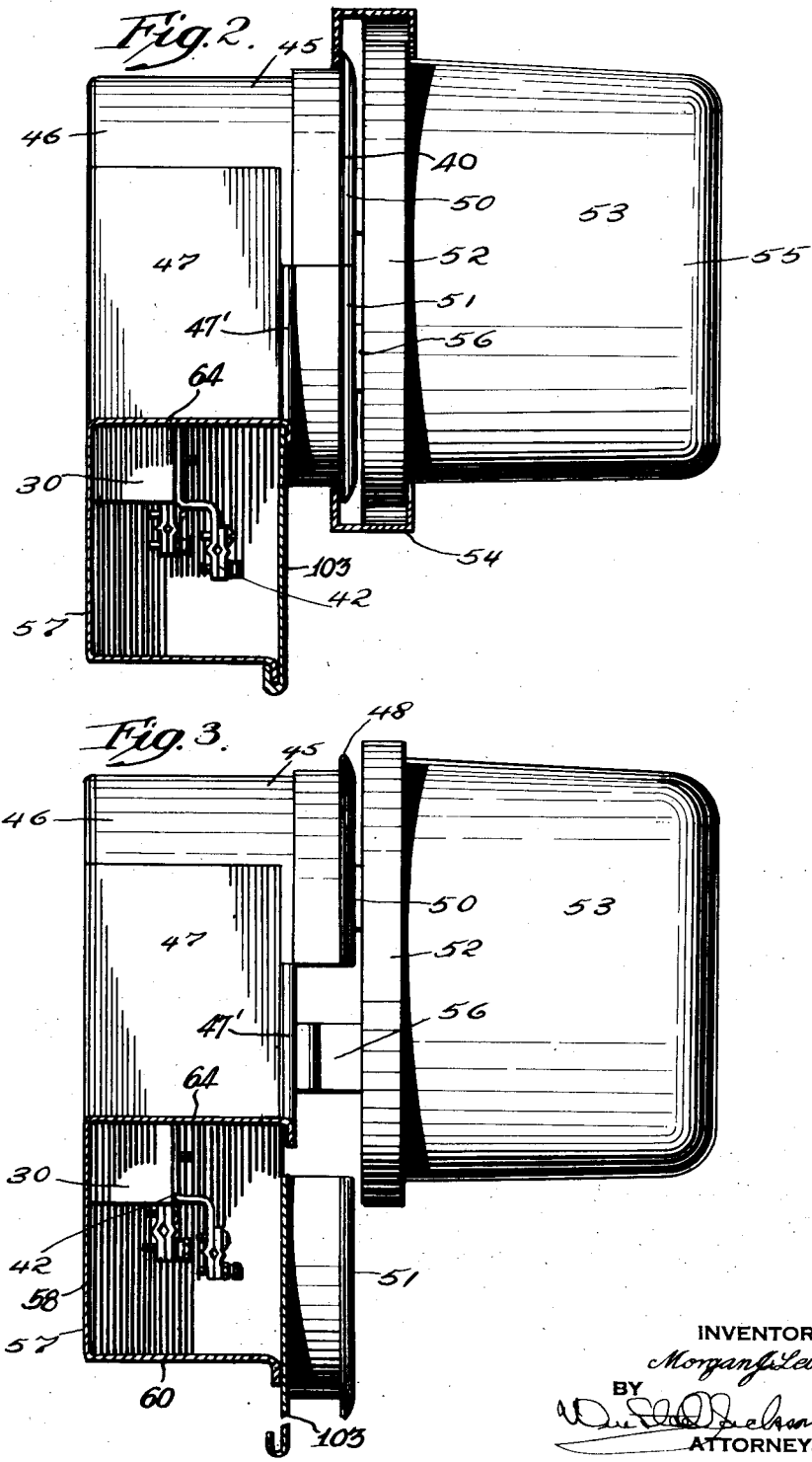
INVENTOR
Morgan J. Lewis
BY
ATTORNEYS Jan. 15, 1952 M. J. LEWIS 2,582,638
METER TROUGH AND BOX
Filed Aug. 5, 1949 4 Sheets-Sheet 4
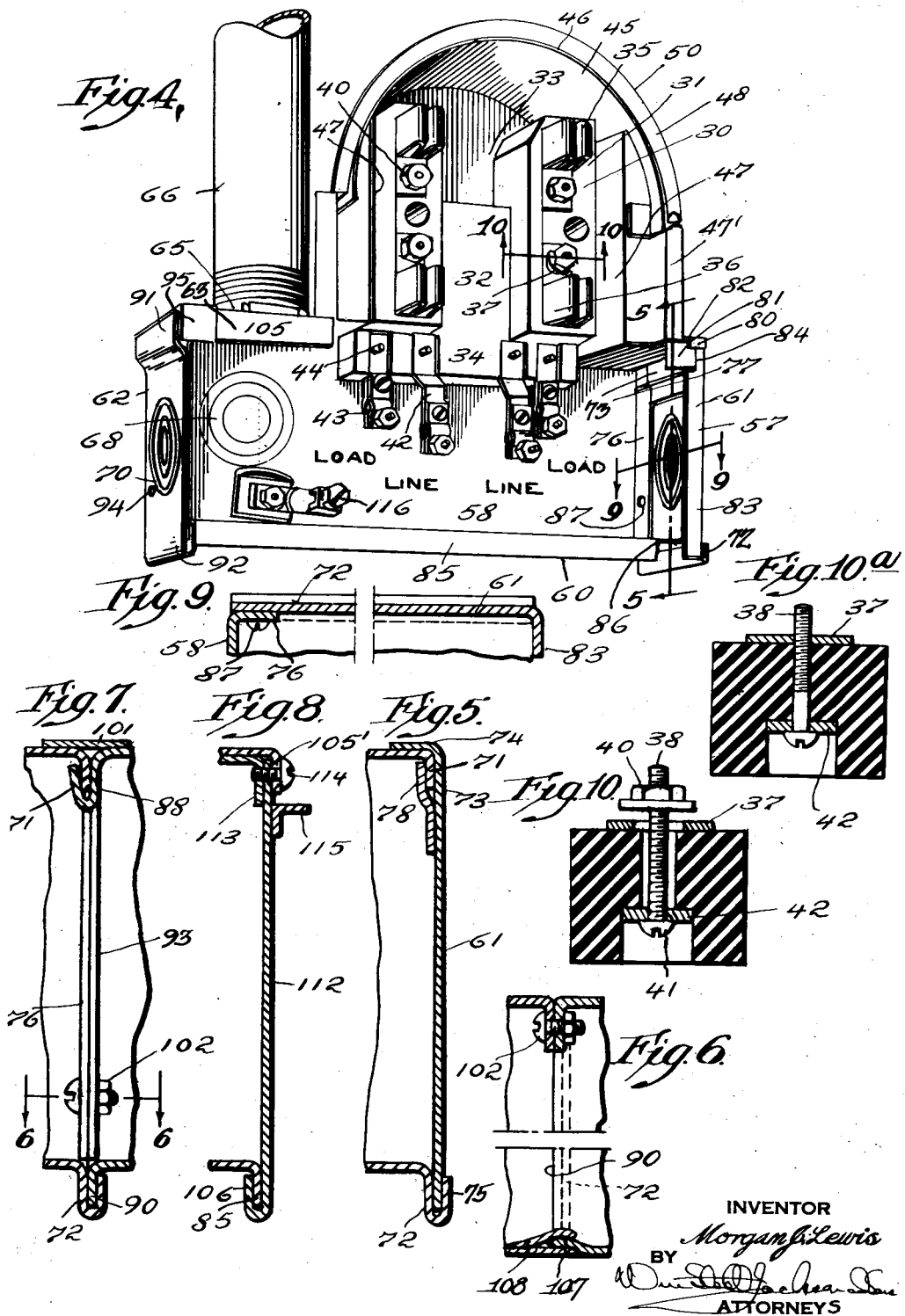
INVENTOR
Morgan J. Lewis
BY
ATTORNEYS Patented Jan. 15, 1952

2,582,638

UNITED STATES PATENT OFFICE 2,582,638

METER TROUGH AND BOX

Morgan J. Lewis, Philadelphia, Pa.

Application August 5, 1949, Serial No. 108,681

19 Claims. (Cl. 175—222)

1

The present invention relates to electrical box systems and particularly to meter troughs and boxes associated therewith.

A purpose of the invention is to avoid damage to electrical connections of a meter trough due to introduction of moisture.

A further purpose is to permit testing of a meter without disconnecting the service of the user.

A further purpose is to facilitate inspection of all boxes associated with an electric meter without requiring disconnection of wiring.

A further purpose is to facilitate adjustment and extension of the equipment associated with a meter socket by providing interchangeable units, and to protect such units both against introduction of dirt and moisture, and also against tampering.

A further purpose is to provide an offset on a box associated with a meter socket and to make electrical connection at the offset.

A further purpose is to provide removable ends in a meter trough box and to permit interconnection of other boxes at one or both ends.

A further purpose is to use the cover of a meter trough box to bar separation of the box from an adjoining interlocked box.

Further purposes appear in the specification and in the claims.

In the drawings I have chosen to illustrate one only of the numerous main embodiments in which my invention may appear, with various adjuncts which may be employed therewith, and with a variation.

Figure 1 is a front elevation of one meter box system embodying the invention.

Figure 1ª is a detached perspective showing the cover removed from a single meter trough and box, having the meter in place.

Figure 2 is a section on the line 2—2 of Figure 1ª, with the locking collar in axial section, and the cover in place.

Figure 3 is a view similar to Figure 2 with the cover partially removed and broken away, omitting the locking collar on the meter.

Figure 4 is a perspective similar to Figure 1ª with the cover completely removed and also with the meter removed.

Figure 5 is a vertical section of Figure 4 on the line 5—5.

Figure 6 is a horizontal section of Figure 1 on the line 6—6, corresponding also to a section of Figure 7 or 11 on the line 6—6.

Figure 7 is a vertical section of Figure 12 on the line 7—7.

2

Figure 8 is a vertical section of Figure 11 on the line 8—8.

Figure 9 is a horizontal section of Figure 4 on the line 9—9.

Figure 10 is a horizontal section of Figure 4 on the line 10—10.

Figure 10ª is a variation of Figure 10.

Figure 11 is an enlarged fragmentary view similar to Figure 1 and showing a variation in the boxes used.

Figure 12 is a fragmentary top plan view of Figure 11 to reduced scale, the conduit being sectioned.

Describing in illustration but not in limitation and referring to the drawings:

In the conventional electric watthour meter sockets at present on the market, the socket carries a group of jaw contacts which make contact with knife blades on the meter itself. The meter has a meter ring which mates with a socket ring on the socket, and the two are locked together by a locking collar, which is usually clamped and sealed closed by a suitable seal. The jaw contacts normally have terminals directly adjacent the jaws and the upper portion of the trough surrounding the socket carries a knockout or other suitable connection for the service and load busses.

This construction presents the difficulty that, in making periodic inspections and tests, both to determine whether the meter is functioning properly and also to be sure that the device has not been tampered with, it is necessary to disconnect the electric current from the user. This is often troublesome and dangerous, as it may result in stopping electric appliances such as clocks, oil burners or the like.

A further difficulty has been encountered in the use of prior art electric meter and socket combinations. The wire has often led directly into the socket, usually at the top, so that condensation or rain water coming down the inside of the conduit has been brought into contact with the jaw contacts and is likely to cause electrical failure or to soil or corrode the contacts. The prior art devices have also not been flexible from the standpoint of installation, necessitating the improvisation of an arrangement of interconnected boxes where circuit breakers and other associated equipment are to be used adjoining the meter. This has the disadvantage that in such improvised arrangements the wiring is readily tampered with.

In accordance with the present invention, the difficulties above referred to are largely overcome. It is possible to gain access to the socket terminals without removing the meter, so that service can be maintained for the user during a temporary removal of the meter for inspection and tests. At the same time the socket is very secure against tampering.

The device of the invention also protects against entry of moisture from the service bus connections into the socket.

Much greater flexibility is provided in accordance with the invention in interconnecting with other equipment, and the arrangement resulting is safer from tampering than in the prior art.

Certain broader aspects relating to the mounting of a separable segment of the socket ring on the cover of the meter box are described and claimed in my copending application Ser. No. 91,686, filed May 6, 1949, now Patent No. 2,548,540, for Meter and Meter Socket. The special features of the mounting of the jaw contacts are covered by my copending application Serial No. 108,682, filed August 5, 1949, for Electric Instrument Socket.

In accordance with the invention, in the preferred embodiment, the socket itself comprises an insulating base 30, suitably of electrical porcelain or phenolic plastic, conveniently of rectangular formation, having two generally vertical columns 31 connected by a recessed web 32. The web is omitted between the columns at the upper portion leaving a top recess 33. The web is downwardly extended to provide a terminal shelf 34. The metallic jaw contacts 35 are located conveniently at the corner of a rectangle (square) in accordance with standard practice for positioning the contacts of a meter socket. Each of the jaw contacts includes reversely bent upstanding resilient contact arms 36 and a base connector 37 which is, in the preferred embodiment (Figure 10), recessed to clear adequately from a contact bolt 38 and is connected thereto by a bridging test nut 40 when the nut is screwed down. Each contact bolt 38 connects at the opposite side of the base in a channel 41 with a terminal strip 42, the terminal strips extending generally parallel with one another to a position laterally removed from the base as seen in Figures 1ᵃ, 2, 3 and 4. The various terminal strips correspond to line and load position as shown in Figures 1ᵃ and 4. Each of the terminal strips carries at its end remote from the jaw contacts suitable connector clamps 43 and at the shelf 34 is conveniently secured to the base by a screw 44.

The base and the jaw contacts are surrounded at the top and sides by a trough 45 having a semi-cylindrical upper surface 46 and generally parallel sides 47 extending parallel to the terminal strips. The sides at the front are provided with inwardly directed reverse bend guides 47'. At the front of the trough is mounted a socket ring 48 having the usual flange end surrounding the jaw contacts. The socket ring consists of a semi-circular portion 50 (the upper portion as shown) which is secured to the trough and a removable segment 51 located at the side toward the ends of the terminals remote from the jaw contacts.

The socket ring 48 in locking position of the meter cooperates with a coaxial meter ring 52 mounted near the base of the meter 53 and the socket ring and meter ring are locked together as well known by a split locking collar 54 (Figure 2) with suitable seals to prevent tampering. The meter normally has the usual bowl-like transparent front 55 and at the base has knife contacts 56 which extend into and engage with the jaw contacts 35 of the socket.

The trough in the present instance interiorly communicates with a suitably rectangular elongated terminal box 57 which surrounds the ends of the terminal strips remote from the jaw contacts.

The terminal box has a closed rear 58, a closed bottom 60 and removable ends 61 and 62. To one side of the trough, the box is provided with an offset 63 giving rise to a top wall 64 provided with a knockout or other suitable connection 65 for an electric conduit 66 conveniently secured, as by locking nut 67 on the threaded end of the conduit. It will thus be evident that when the conduit is positioned in the knockout 65, any moisture entering through the line or load bus is positioned to the side of the socket and to the side of the terminals and flows down harmlessly to the bottom of the box without causing corrosion or moistening of the socket.

The box is provided with other suitable knockouts at convenient points, one of which is shown at 68 and another at 70.

In the preferred embodiment one or both end walls are removable. At the right end in Figures 1ᵃ and 2 as best seen in Figure 5, the edge of the end wall is provided with a male inward flange or sliding interlock 71 at the top of the end wall and a female outside reverse bend flange or sliding interlock 72 at the bottom which respectively engage with cooperating sliding interlocks on the end wall 61. To accomplish this purpose the male sliding interlock 71 is straddled by a female sliding interlock 73 and to prevent entry of moisture the top of the cover is flanged over at 74. At the bottom the end 61 has a male sliding interlock 75 extending into the reverse bend of the female sliding interlock 72. At the back the rear wall is outwardly flanged at 76 engaging the rear end 77 of the inner portion 78 of the female sliding interlock 73, to prevent removal of the end wall by sliding toward the back to and require removal by sliding forwardly. A further stop is provided by a dog 80 on the flange 74 at the upper front edge which engages a stop 81 on a short top wall 82 at the right side of the box (Figure 4). To provide for locking, the end wall 61 is inwardly flanged at 83 at the front and this flange is recessed at 84 to clear the stop 82. The bottom wall 60 is outwardly flanged at 85 and this flange is cut away at 86 at the right end to avoid interference with the flange 83 on the right end wall.

The right end wall, in addition to the locking referred to herein may to advantage be secured by a screw 87 from the end wall through the flange 76 of the rear wall.

The removable left end wall is constructed somewhat similarly but differently operated.

As best seen in Figure 7, there is provided at the top edge of the left end wall on the top wall of the offset an outwardly directed inwardly extending reverse bend flange or female sliding interlock 88 and at the bottom an outwardly directed flange or male sliding interlock 90.

The left end wall 62 has an upwardly extending female interlock 91 (Figure 4) at the top and an upwardly extending female interlock 92 at the bottom. These mate respectively with the outside of the female sliding interlock 88 at the top and with the male sliding interlock 90 at the bottom. A flange 93 from the back wall extends outwardly and is engaged by a bolt 94 through the end wall and the flange and preferably blind on the outside to prevent unauthorized removal.

Thus it will be evident that while the right hand removable cover is slid out forwardly the left hand removable cover is slid downwardly for the purpose of removal, being prevented from moving forwardly by a stop 95 bent down from the top of the offset and being prevented from moving rearwardly by the inner portion of the female interlock 91 although the slot of the interlock is located adequately beyond the flange 93 from the back of the box.

In many types of service the meter box of the invention should be assembled with other equipment. Figure 1 shows the assembly with an adjoining suitably identical meter box 96 on the right, while Figure 11 shows assembly with an adjoining box 97 for a circuit breaker or similar device which is in turn connected at its right with an adjoining meter box 98.

In any case the connection between two adjoining boxes as shown in Figure 7 is representative of the connection made between two boxes at the right of one box and also at the left of the other box, since both right end sliding interlocks and also left end sliding interlocks are involved in each connection. The right end sliding interlock on each box is open for introduction of the mating box from the front while correspondingly the left end sliding interlock is open for introduction of the mating box at the rear, so that in bringing two boxes into interlock relation the left end of one box is brought in front of the right end of another box and the two pushed relatively together until they reach the position shown at any one of the joints 100 in Figures 1, 11 and 12.

As best seen in Figure 7, the right end male sliding interlock 71 at the top mates in the left end female sliding interlock 88 of the next adjoining box to the right, while at the bottom the right end female sliding interlock 72 mates in the left end male sliding interlock 90. At the top a strip 101 secured on the left end box overlaps the adjoining box and provides a weather seal, and conveniently carries the stop 95. It may be spot welded or otherwise secured to the top of the offset.

To provide supplemental engagement of the parts after they are interlocked, a bolt 102 extends through the walls of the rear flanges 76 and 93 in the holes occupied by the bolts 87 and 94 when the removable covers are in place. The bolt 102 is not essential but is used out of excess of precaution.

The meter box is covered at the front by a removable cover 103 which extends over the offset and at its upper end mounts the separable segment of the socket ring as best seen in Figure 1ᵃ.

The cover has on either side of the segment slides 104 extending toward the socket in operating position of the cover and slidably engaging in reverse bend guides 47' at the opposite sides of the box.

At the offset the top is downwardly flanged at 105, in line with the stop 81 at the right hand corner, and the cover in closed position locks under the flange 105 and under the stop 81, providing a weather seal which prevents moisture from running into the box.

At the bottom the cover has an inner reverse flange 106 which interlocks about the downward flange 85 as shown in Figure 8 (applying to a special form of box but having the same construction at the bottom of the cover).

At the right and left end, as best seen in Figures 1 and 11, the adjoining covers each extend over the sliding interlocks 71, 72, 88 and 90 and prevent the respective sliding interlocks from moving to displace the boxes. Thus once the covers are fastened in place and locked by the locking collar, the locking of the covers locks the boxes against separation from one another and the boxes cannot be separated until the covers are removed after taking off the locking collars. The covers at the opposite ends slightly overlap to provide continuous sealing between a tongue 107 on the left end and a groove 108 on the right end of each cover (Figure 6).

Due to the tongue and groove relationship, however, the parts overlap so that either the cover of the right hand box or the cover of the left hand box will prevent separation of the boxes as long as it remains in place. The removal of the box to the right is barred by the engagement of a particular cover over the sliding interlock paths, and the removal of the box to the left is barred by the engagement of the same cover at the left under the stop 81 of the left hand box. At the same time that the cover on an individual box bars removal of the box at the right by closing its sliding interlocks and bars removal of the box to the left by engaging under its stop, the cover of the box to the right engages under the stop of the individual box and the cover of the box to the left closes its sliding interlocks.

In the case of the special box 97, a box for a circuit breaker, fuse box, junction box or the like 110 is interconnected with a longitudinally extending interlocking box 111, provided with a special rectangular cover 112 as shown in Figure 8, which is reversely flanged at 106 at the bottom and engages over the flange 85 on the box bottom. At the top it engages under an elongated flange 105' and outside of an internal locking strip 113 on the box to which it is attached by a screw 114. A suitable seal bracket 115 is provided on the cover for interlocking of a seal to a hole in the screw as well known to prevent detachment of the screw by an unauthorized person.

It will be evident that the sequence of interlocking boxes provides a rectangular channel through which the various meters, circuit breaker and the like can be internally interwired without danger of tampering, one conduit 66 normally being sufficient for the entire system. The individual boxes are provided with individual ground clamps 116 and the boxes can be separately grounded or grounded together.

It will be understood that at the extreme right and left hand end of each system the removable end walls will remain in place although they can of course be taken off during the wiring of the system to provide ready access to the interior.

The test nuts are conveniently used when the meter is shorted at the terminals for test and a test mounting is to be fixedly mounted but not electrically connected at the jaw contacts. In some cases this feature is not necessary and where that is the condition the bolt 38 is directly threaded into the contact base 37' as shown in Figure 10ᵃ.

In operation it will be understood that where the device of the invention is to be used as a single box it will be assembled as shown in Figures 1ᵃ, 2, 3 and 4, connecting the conduit at the offset. The removable ends and the cover at the extreme ends will be removed for wiring, but once the device is wired the removable ends will be snapped into place, sliding the right hand one from the front rearward in the sliding interlocks and sliding the left hand one upwardly into the interlocks. Both end walls will preferably be screwed into place by bolts having blind heads to prevent unauthorized removal. The cover will then be slid upwardly in the guides, until it engages under the flange 105 and the stop 81 and behind the flange 85. When locked in position it will complete the socket ring and will lock the right hand cover against removal. The meter can then be installed in the socket and the entire structure locked by the meter locking collar around the socket ring and the meter ring.

Where a plurality of boxes are to be interconnected, the removable end walls are taken off at the ends to be interconnected and the right hand box is positioned forwardly of the left hand box and the sliding interlocks snap together. The structure is then wired, and after wiring the respective covers are slid into place. On all meter boxes the covers are held by the engagement of the locking ring with the separable segment, but on other boxes such as circuit breaker boxes they are secured as by screws and seals. The presence of the covers prevents separation of the interlocks since each cover overlaps the path which would be traversed by the interlocks in moving apart.

It will thus be evident that units of indefinite length provided with space in their boxes for internal wiring and open internally clear through from one end to the other may be provided as shown in Figures 1, 11 and 12.

Any moisture introduced through the conduit will preferably avoid the socket and fall harmlessly to the bottom of the box.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In an electrical box, a socket for attachment to a meter or the like, a trough around the socket and having a socket ring provided with a separable segment, a box displaced from the socket and connected to the trough, a lateral offset on the box beyond the trough having an electric lead-in connection, and a removable cover on the box covering the offset and mounting the separable segment of the socket ring.

2. In an electrical box, a socket for attachment to a meter or the like, a trough around the socket and having a socket ring provided with a separable segment, a box displaced from the socket and connected to the trough, guides on the box extending toward the center of the socket from the side having the separable segment, a lateral offset on the box beyond the trough having an electric lead-in connection and a removable cover on the box covering the offset, slidably interlocked in the guides and mounting the separable segment of the socket ring.

3. In an electrical box, a socket base, jaw contacts on the base in spaced relation for connection to a meter, terminal strips extending to one side of the jaw contacts and connected to the respective jaw contacts, a trough surrounding the base and jaw contacts and having a socket ring provided with a separable segment on the side at which the terminal strips extend away from the jaw contacts, a box surrounding the ends of the terminal strips remote from the jaw content, a box offset beyond the trough at right angles to the terminal strips and provided with a lead-in connection and a removable cover on the box covering the offset and mounting the separable segment of the socket ring.

4. In an electrical box, a socket base, jaw contacts on the base in spaced relation for connection to a meter, terminal strips extending to one side of the jaw contacts and connected to the respective jaw contacts, a trough surrounding the base and jaw contacts and having a socket ring provided with a separable segment on the side at which the terminal strips extend away from the jaw contacts, a box surrounding the ends of the terminal strips remote from the jaw contacts, a box offset beyond the trough at right angles to the terminal strips and provided with a lead-in connection, spaced guides on the box extending toward the center of the jaw contacts and a removable cover on the box covering the offset, slidably interlocking with the guides and mounting the separable segment of the socket ring.

5. In an electrical box, a base, jaw contacts on the base in spaced relation to contact a meter, terminal strips electrically connected with the jaw contacts and extending away from the jaw contacts in one direction, a trough surrounding the jaw contacts and having a socket ring provided with a separable segment on the side at which the terminal strips extend away from the jaw contacts, a box surrounding the ends of the terminal strips remote from the jaw contacts and having sliding interlocks at one end, a removable end slidable in the interlocks, and a cover for the box interlocked therewith, mounting the separable segment and in closed position extending across the path of withdrawal and barring withdrawal of the removable end.

6. In an electrical box, a base, jaw contacts on the base in spaced relation to contact a meter, terminal strips electrically connected with the jaw contacts and extending away from the jaw contacts in one direction, a trough surrounding the jaw contacts and having a socket ring provided with a separable segment on the side at which the terminal strips extend away from the jaw contacts, a box surrounding the ends of the terminal strips remote from the jaw contacts and having sliding interlocks at one end, a removable end slidable in the interlocks, guides on the box directed toward the center of the jaw contacts, and a cover for the box slidably positioned in the guides, mounting the separable segment and in closed position extending across the path of withdrawal and barring withdrawal of the removable end.

7. In an electrical box system, a socket for attachment to a meter or the like, a trough around the socket provided with a socket ring having a removable segment, a first box displaced from the socket on the same side as the separable segment and connected to the trough, the first box having sliding interlocks at one end, a second box having cooperating sliding interlocks at one end which engage with the sliding interlocks on the first box and a cover on the first box interlocking therewith, mounting the separable segment and in closed position obstructing the sliding relative movement between the boxes and thereby barring separation of the sliding interlocks.

8. In an electrical box system, a base, a plurality of jaw contacts on the base positioned to engage a meter, a trough surrounding the jaw contacts and having a socket ring having a separable segment at one side, terminal strips electrically connected to the jaw contacts and extending out from them toward the side having the separable segment, a box surrounding the ends of the terminal strips remote from the jaw contacts, sliding interlocks on one wall of the box directed in the same direction as the axis of the socket ring and a cover having sliding interlock connection with the box, mounting the separable segment of the socket ring and extending over the sliding interlocks on the one wall in position to bar removal of an interlocking member therefrom.

9. In an electrical box system, a base, a plurality of jaw contacts on the base positioned to engage a meter, a trough surrounding the jaw contacts and having a socket ring provided with a separable segment at one side, terminal strips electrically connected to the jaw contacts and extending out from them toward the side having the separable segment, a box surrounding the ends of the terminal strips remote from the jaw contacts, sliding interlocks at opposite edges of one wall of the box extending in the direction of the axis of the socket ring, guides on the box extending transversely to the sliding interlocks and a cover for the box having sliding interconnection with the guides, mounting the separable segment of the socket ring and extending across the sliding interlocks in position to bar removal of a member interlocked therewith.

10. In an electrical box system, a base, a plurality of jaw contacts on the base positioned to engage a meter, a trough surrounding the jaw contacts and having a socket ring provided with a separable segment at one side, terminal strips electrically connected to the jaw contacts and extending out from them toward the side having the separable segment, a box surrounding the ends of the terminal strips remote from the jaw contacts, sliding interlocks at opposite edges of two opposite walls of the box extending in the direction of the axis of the socket ring and a cover having sliding interlock relation with the box, mounting the separable segment of the socket ring and extending across the ends of one set of sliding interlocks and preventing removal of a member mounted therein.

11. In an electrical box system, a base, a plurality of jaw contacts on the base positioned to engage a meter, a trough surrounding the jaw contacts and having a socket ring provided with a separable segment at one side, terminal strips electrically connected to the jaw contacts and extending out from them toward the side having the separable segment, a box surrounding the ends of the terminal strips remote from the jaw contacts, sliding interlocks at opposite edges of two opposite walls of the box extending in the direction of the axis of the socket ring, guides on the box directed toward the center of the socket ring from the side having the separable segment and a cover having sliding interconnection with the guides, mounting the separable segment of the socket ring and extending across the ends of the sliding interlocks at one end in position to bar removal of a member therefrom.

12. In an electrical box system, a base, a plurality of jaw contacts on the base positioned to engage a meter, a trough surrounding the jaw contacts and having a socket ring provided with a separable segment at one side, terminal strips electrically connected to the jaw contacts and extending out from them toward the side having the separable segment, a first box surrounding the ends of the terminal strips remote from the jaw contacts, sliding interlocks at opposite edges of one open wall of the first box extending in the direction of the axis of the socket ring, a second box having a cooperating open end and having cooperating sliding interlocks mating with the sliding interlocks in the first box, a cover for the first box interlocking therewith and mounting the separable segment, and a cover for the second box interlocking therewith, one of the covers extending over the open ends of the sliding interlocks and barring relative displacement of the boxes.

13. In an electrical box system, a base, a plurality of jaw contacts on the base positioned to engage a meter, a trough surrounding the jaw contacts and having a socket ring provided with a separable segment at one side, terminal strips electrically connected to the jaw contacts and extending out from them toward the side having the separable segment, a first box surrounding the ends of the terminal strips remote from the jaw contacts, sliding interlocks at opposite edges of one open wall of the first box extending in the direction of the axis of the socket ring, a second box having a cooperating open end and having cooperating sliding interlocks mating with the sliding interlocks in the first box, a cover for the first box interlocking therewith and mounting the separable segment, a cover for the second box interlocking therewith, and a stop on one box engaged by the cover of the other box, one of the covers extending over the open ends of the sliding interlocks and barring relative displacement of the boxes and the other cover engaging the stop and barring relative displacement of the boxes.

14. In an electrical box system, an insulating base, a plurality of jaw contacts spaced to engage a meter and mounted on the insulating base, a trough surrounding the jaw contacts and having a socket ring extending around the jaw contacts and provided with a separable segment, terminal strips connected to the respective jaw contacts and extending from them in the direction of the side having the separable segment, a first box surrounding the ends of the terminal strips remote from the jaw contacts and having sliding interlocks at opposite open ends of the box, the sliding interlocks being accessible for interconnection only at the face of the box, guideways on the face of the box at either side extending toward the trough, a second box having an open end provided with cooperating sliding interlocks at opposite edges which are engaged in the sliding interlocks at one end of the first box and a cover for the first box having slides engaged in the guideways and extending across the open ends of the sliding interlocks and barring relative separation of the boxes at the sliding interlocks.

15. In an electrical box system, an insulating base, a plurality of jaw contacts spaced to engage a meter and mounted on the insulating base, a trough surrounding the jaw contacts and having a socket ring extending around the jaw contacts and provided with a separable segment, terminal strips connected to the respective jaw contacts and extending from them in the direction of the side having the separable segment, a box surrounding the ends of the terminal strips remote from the jaw contacts and having sliding interlocks at opposite open ends of the box, the sliding interlocks being accessible for interconnection only at the front face of the box, guideways on the front of the box at either side extending toward the trough, two other boxes each having an open end and each having on opposite edges of that end sliding interlocks cooperating with the sliding interlocks at the opposite ends of the first box and one of which has at one end sliding interlocks accessible for interconnection only at the front face of that box, a stop on one of the other boxes in position to engage the cover on the first box and lock the boxes together and a cover for the first box having slides in the guideways, mounting the separable segment, at one end covering the sliding interlocks on the first box and at the other end engaging behind the stop, thereby barring relative separation of the second and third box from the first box.

16. In an electric box system, an insulating base, a plurality of jaw contacts spaced to engage a meter and mounted on the insulating base, a trough surrounding the jaw contacts and having a socket ring extending around the jaw contacts and provided with a separable segment, terminal strips connected to the respective jaw contacts and extending from them in the direction of the side having the separable segment, a box surrounding the ends of the terminal strips remote from the jaw contacts and having sliding interlocks at opposite open ends of the box, the sliding interlocks at each end being accessible for interconnection only at one face of the box, guideways on the front of the box at either side extending toward the trough, a second box having an open end provided with sliding interlocks at the opposite edges cooperating with the sliding interlocks on the first box, a cover for the first box having slides in the guideways, mounting the separable segment, a cover interlocked at the face of the second box, walls forming a tongue and groove interconnection between the covers, the covers at the tongue and groove interconnection extending across the open end of the interlocks and barring relative separation of the two boxes.

17. In an electric box system, an insulating base, a plurality of jaw contacts spaced to engage a meter and mounted on the insulating base, a trough surrounding the jaw contacts and having a socket ring extending around the jaw contacts and provided with a separable segment, terminal strips connected to the respective jaw contacts and extending from them in the direction of the side having the separable segment, a box surrounding the ends of the terminal strips remote from the jaw contacts and having sliding interlocks at opposite open ends of the box, the sliding interlocks being accessible for interconnection only at one face of the box, guideways on the front of the box at either side extending toward the trough, second and third boxes each having open ends provided at their opposite edges with cooperating sliding interlocks engaged in the sliding interlocks at the opposite ends of the first box, a cover for the first box having slides engaged in the guideways, mounting the separable segment, and covers secured on the faces of the second and third boxes, the covers of the boxes cooperating with the sliding interlocks and the boxes when the covers are in position to bar separation of the boxes.

18. In an electric box system, an insulating base, a plurality of jaw contacts spaced to engage a meter and mounted on the insulating base, a trough surrounding the jaw contacts and having a socket ring extending around the jaw contacts and provided with a separable segment, terminal strips connected to the respective jaw contacts and extending from them in the direction of the sides having the separable segment, a box surrounding the ends of the terminal strips remote from the jaw contacts and having sliding interlocks at opposite open ends of the box, the sliding interlocks being accessible for interconnection only at one face of the box, guideways on the front of the box at either side extending toward the trough, second and third boxes each having open ends provided at their opposite edges with cooperating sliding interlocks engaged in the sliding interlocks at the opposite ends of the first box, a cover for the first box having slides engaged in the guideways, mounting the separable segment, covers secured on the faces of the second and third boxes, the covers of the boxes cooperating with the sliding interlocks and the boxes when the covers are in position to bar separation of the boxes, there being tongue and groove interconnection between each cover and the adjoining cover, and the tongue and groove interconnections extending across the open ends of the interlocks and cooperating with the boxes to bar separation of the boxes.

19. In an electric box system, an insulating base, a plurality of jaw contacts spaced to engage a meter and mounted on the insulating base, a trough surrounding the jaw contacts and having a socket ring extending around the jaw contacts and provided with a separable segment, terminal strips connected to the respective jaw contacts and extending from them in the direction of the side having the separable segment, a box surrounding the ends of the terminal strips remote from the jaw contacts and having sliding interlocks at opposite open ends of the box, guideways on the face of the box at either side extending toward the trough, a flange at the forward face of the box on the edge remote from the socket, a second box having an open end and having at opposite edges sliding interlocks which interconnect with the interlocks on the first box, a cover for the first box having slides engaging in the guideways, mounting the separable segment and having at the end opposite from the separable segment a groove which engages around the flange, and a cover for the second box, one of the covers extending into locking relation with the sliding interlocks and barring relative separation of the boxes.

MORGAN J. LEWIS.

REFERENCES CITED

The following references are of record in the file of this patent:

UNITED STATES PATENTS

| Number | Name | Date |
| --- | --- | --- |
| 1,316,218 | Bloomer | Sept. 16, 1919 |
| 1,739,142 | Hill | Dec. 10, 1929 |
| 1,965,329 | Abbott | July 3, 1934 |
| 2,131,641 | Sachs | Sept. 27, 1938 |
| 2,270,228 | Palmer | Jan. 20, 1942 |
| 2,412,558 | Blank | Dec. 17, 1946 |